United States Patent
Di Caprio et al.

(10) Patent No.: US 8,538,427 B2
(45) Date of Patent: Sep. 17, 2013

(54) METHOD FOR OBTAINING TELECOMMUNICATIONS SERVICES THROUGH A TELECOMMUNICATIONS TERMINAL

(75) Inventors: Gaetano Di Caprio, Turin (IT); Corrado Moiso, Turin (IT); Paolo Vailati, Turin (IT)

(73) Assignee: Telecom Italia S.p.A., Milan (IT)

( * ) Notice: Subject to any disclaimer, the term of this patent is extended or adjusted under 35 U.S.C. 154(b) by 716 days.

(21) Appl. No.: 11/989,387

(22) PCT Filed: Jul. 28, 2005

(86) PCT No.: PCT/EP2005/008183
§ 371 (c)(1),
(2), (4) Date: Sep. 1, 2009

(87) PCT Pub. No.: WO2007/016932
PCT Pub. Date: Feb. 15, 2007

(65) Prior Publication Data
US 2010/0004019 A1    Jan. 7, 2010

(51) Int. Cl.
*H04W 8/00* (2009.01)
(52) U.S. Cl.
USPC .................................... 455/435.2; 455/552.1
(58) Field of Classification Search
USPC ............... 455/550.1–555, 432.1–435.1, 406; 709/229; 370/232
See application file for complete search history.

(56) References Cited

U.S. PATENT DOCUMENTS

| | | | |
|---|---|---|---|
| 5,915,214 A | 6/1999 | Reece et al. | |
| 6,101,379 A | 8/2000 | Rahman et al. | |
| 6,748,439 B1 * | 6/2004 | Monachello et al. | 709/229 |
| 2003/0003933 A1 | 1/2003 | Deshpande et al. | |
| 2004/0121758 A1 | 6/2004 | Hoche et al. | |
| 2004/0162058 A1 | 8/2004 | Mottes | |
| 2005/0143095 A1 | 6/2005 | Jacob | |
| 2006/0111079 A1 * | 5/2006 | Tischer et al. | 455/406 |
| 2006/0166668 A1 * | 7/2006 | Choi et al. | 455/435.2 |

FOREIGN PATENT DOCUMENTS

| | | |
|---|---|---|
| GB | 2 405 557 | 3/2005 |
| JP | 2002-251341 | 9/2002 |
| JP | 2004-134825 | 4/2004 |
| WO | WO 99/30479 | 6/1999 |
| WO | WO 02/093289 A3 | 11/2002 |

OTHER PUBLICATIONS

ETSI: "Universal Mobile Telecommunications System (UMTS); Multimedia Broadcast/Multicast Service (MBMS); Architecture and Functional Description (3GPP TS 23.246 version 6.7.0 Release 6)", ETSI Technical Specification, pp. 1-49, (2005).
Translation of Office Action dated Feb. 22, 2011, received from Japanese Patent Office in a corresponding application.

* cited by examiner

*Primary Examiner* — Kashif Siddiqui
(74) *Attorney, Agent, or Firm* — Finnegan, Henderson, Farabow, Garrett & Dunner, L.L.P.

(57) ABSTRACT

A telecommunications service to be obtained for a user is split into a plurality of service components. A telecommunications terminal determines the most appropriate service provider for each service component; each of the service components is obtained by a corresponding service provider; and the telecommunications terminal invokes the functionality of each service component according to the service to be obtained. This is particularly useful for wireless mobile telecommunications terminals.

22 Claims, 8 Drawing Sheets

METHOD FOR OBTAINING TELECOMMUNICATIONS SERVICES THROUGH A TELECOMMUNICATIONS TERMINAL

CROSS REFERENCE TO RELATED APPLICATION

This application is a national phase application based on PCT/EP2005/008183, filed Jul. 28, 2005.

FIELD OF THE INVENTION

The present invention relates to the field of telecommunications services and deals with the way in which these can be obtained by a telecommunications terminal.

The present invention is particularly applicable to wireless mobile telecommunications terminals and will be described in the following in this specific case, although it can also be applied to other types of telecommunications terminals or to combinations of terminals of different types.

BACKGROUND OF THE INVENTION

Nowadays, many telecommunications service providers exist in each country.

In the case of wireless mobile communications, users can be very easily reached by the various service providers as this does not require to install wires, i.e. electrical cables or optical fibres, till the premises of the users.

Especially in the field of wireless communications, many service providers offer many different services to the users, which are characterised by diverse parameters, e.g., the services are offered at many different costs. Competition is therefore very high and is generally played in terms of service portfolio, service cost, service quality, service geographical coverage, roaming possibilities in foreign countries.

Nowadays, the competition key strategy is to acquire clients through SIM [Subscriber Identification Module] cards: once a user has a SIM card of a specific service provider in his mobile terminal he will use the various services of this specific service provider only. When the user is not in his own country ("roaming"), he obtains telecommunications services through his mobile terminal from a local service provider that has a business agreement with this specific service provider.

A user may have e.g. two different SIM cards of two different service providers and at any time may choose between the two service providers according to the cost of the required service. This may be implemented e.g. by having two different terminals with the two different SIM cards permanently installed or by having a single terminal and installing the SIM card of the chosen service provider when necessary; it is clear that both these solutions are awkward and the end user experience can be sometimes unacceptable.

From U.S. Pat. No. 6,101,379 it is known a method of acquiring potential tariff charges assessed by wireless service providers to a mobile subscriber prior to registration. The method includes transmitting a request for tariff information by the mobile terminal over a control channel to a candidate service provider. The candidate service provider determines an applicable tariff charge based on various factors such as roaming status, compulsory fees etc. The ensuing tariff charge is then transmitted back to the mobile terminal via the control channel. Subsequent tariff inquiries are made to other potential candidate service providers accessible by the mobile terminal. Once tariff information from all candidate service providers has been received, the mobile terminal may initiate registration e.g. with the cheapest service provider. The tariff information is able to be obtained prior to registering with a service provider, thus costs associated with registration are eliminated. The Applicant has considered this solution but has realized that it would require a substantial change in the present wireless telecommunications infrastructure due to the necessity of the control channel on one side and of the multiple registration possibility by the mobile terminal.

From WO patent application No. 99/30479 it is known a telecommunications system and method for selecting a cellular network by a mobile terminal, while roaming outside of the subscriber home cellular network, based on charging information associated with each cellular network available to the subscriber of the mobile terminal. The cellular networks within the geographical area of the mobile terminal can broadcast the charging information applicable to roaming subscribers from other networks. The identity of each cellular network within the geographical area of the mobile terminal and associated charging information is received by the mobile terminal, which can then select the least cost cellular network. For manual selection, the identity of each available cellular network and associated charging information received by the mobile terminal is displayed to the subscriber, to allow the subscriber to select the desired cellular network. The applicant has considered this solution but has realized that is applicable only to roaming.

From U.S. Pat. No. 5,915,214 it is known a system and method for enabling a user of wireless communication services such as mobile cellular telephone services to easily switch among various available service providers based on real time cost and service feature information. A central processing facility serves as an intermediary between mobile communication users and service providers and broadcasts real time service provider information over an established information channel, in each region served by wireless communication carriers. Users are able to select an optimal service provider based on the received service provider information. The Applicant has considered this solution but has realized that it would require a substantial change in the present wireless telecommunications infrastructure due to the necessity of the central processing facility on one side and of the multiple registration possibility by the mobile terminal.

From patent application U.S. 2004/0162058 it is known a method, a wireless device and a system which enables an end-user to use/subscribe to several service providers and/or Mobile Virtual Network Operators (MVNOs). The various end-user profiles/subscriptions will be managed by the system enabling end users to develop rules for moving between various service providers and/or various MVNOs. The Applicant has considered this solution but has realized that it would require a substantial change in the present wireless telecommunications infrastructure due to the necessity of the management system on one side and of the multiple registration possibility by the mobile terminal.

From patent application U.S. 2004/0121758 it is known an accounting advisor method for guiding a user of a mobile providing a service choice and invoking a selected service, and account processing at a subscriber's mobile telecommunication device that is enabled for processing multiple accounts and advising a user by further recording user behaviour, retrieving accounting information, analysing service and tariff constraints based on recorded user behaviour and retrieved accounting information, and deriving a recommended service and account selection based on said analysing with respect to optimisation criteria and optionally negotiating service and tariff characteristics. It is also known a mobile telecommunication device, a base station, and a computer software product for implementing this method. The Applicant has considered this solution but has realized that it would require that the mobile terminal must be able to manage multiple accounts or multiple SIM cards; in other words, that it must be able to register with several service providers.

From patent application U.S. 2003/0003933 it is known that, in an area being serviced by multiple wireless network access service providers, a service provider is selected for use by a communication device based upon information received from each of the available service providers and a provider selection criterion.

Therefore, from the above, it is already known in a wireless mobile telecommunications terminal to select between different service providers in order to get the best quality, usually the cheapest service. The Applicant has noted that the telecommunications service is obtained by registering with the selected service provider.

Recently, a system and method has been disclosed, in patent application WO02093289, to enable a wireless communications terminal to discover and use different Web Services through a single internet connection.

SUMMARY OF THE INVENTION

Nowadays, service providers are starting to offer sophisticated telecommunication services to the users; for example, the service named "Turbo Call" provided in Italy by TIM Italia (a company of the Telecom Italia group) is a complex (more precisely, "combinational") telecommunications service, which requires a UMTS [Universal Mobile Telecommunications Service] network: a UMTS circuit-switched connection is used for a traditional telephone voice call service (bi-directional voice transfer), while a UMTS packet-switched connection is used for images or video transfer service.

The Applicant is presently considering and studying more complex telecommunications services. A first example of a complex telecommunications service is "calling the nearest hospital"; this could require a location service for identifying the position of the mobile terminal, a search service for identifying the telephone number of the hospital nearest to the position previously identified, and a telephone call service to the identified telephone number. A second example of a complex telecommunication service is "reserving a hotel room in the vicinity"; this could require a location service for identifying the position of the mobile terminal, a list service for receiving the hotels and their details (e.g. name, address, category, cost, . . . that can be provided by a privately managed "hot spot", i.e. a public access wireless LAN [Local Area Network]) located in an area surrounding the identified position, a map service for receiving a map of an area surrounding the identified position, a voice or video telephone call service for reserving a room in one of the listed hotels at the choice of the user. In the future, the Applicant expects even more complex telecommunications services to be deployed.

Therefore, "complex" telecommunications services requires a number (i.e., at least two) of "simple" telecommunications services (e.g., voice call service through GSM connectivity, SMS service through GSM connectivity, video call service through UMTS connectivity, IP service through GPRS connectivity, terminal location service through GSM or UMTS connectivity, . . . ) to be provided contemporaneously and/or sequentially; in this context, a "simple" telecommunications service is to be considered a "service component" of the "complex" telecommunications service.

The Applicant has understood that it may be advantageous to obtain different service components from different service provider not only for competitive purposes but also for specialization purposes (for example, a service provider may be specialized in the SMS service or in the location service).

It is the object of the present invention to provide a method for obtaining telecommunications services from different service providers that overcomes the drawbacks of the prior art.

It is a another object of the present invention to provide a method for obtaining telecommunications services from different service providers that is fully applicable both to simple telecommunications services and to complex telecommunications services.

It is a further object of the present invention to provide a method for obtaining telecommunications services from different service providers that does not need to register with more than one service provider.

According to the invention, by selecting a cellular network the subscriber does not need to select a whole service bundle available in a single selected network According to the present invention, a telecommunications service to be obtained for a user is split into service components, the telecommunications terminal determines the most appropriate service provider for each service component, each of the service components is obtained by a connection with a corresponding service provider, and the telecommunications terminal invokes the functionality of each service component according to the service to be obtained.

The present invention will be more apparent from the following description to be considered in conjunction with the accompanied drawings, in which:

DETAILED DESCRIPTION OF THE INVENTION

Figure 1:
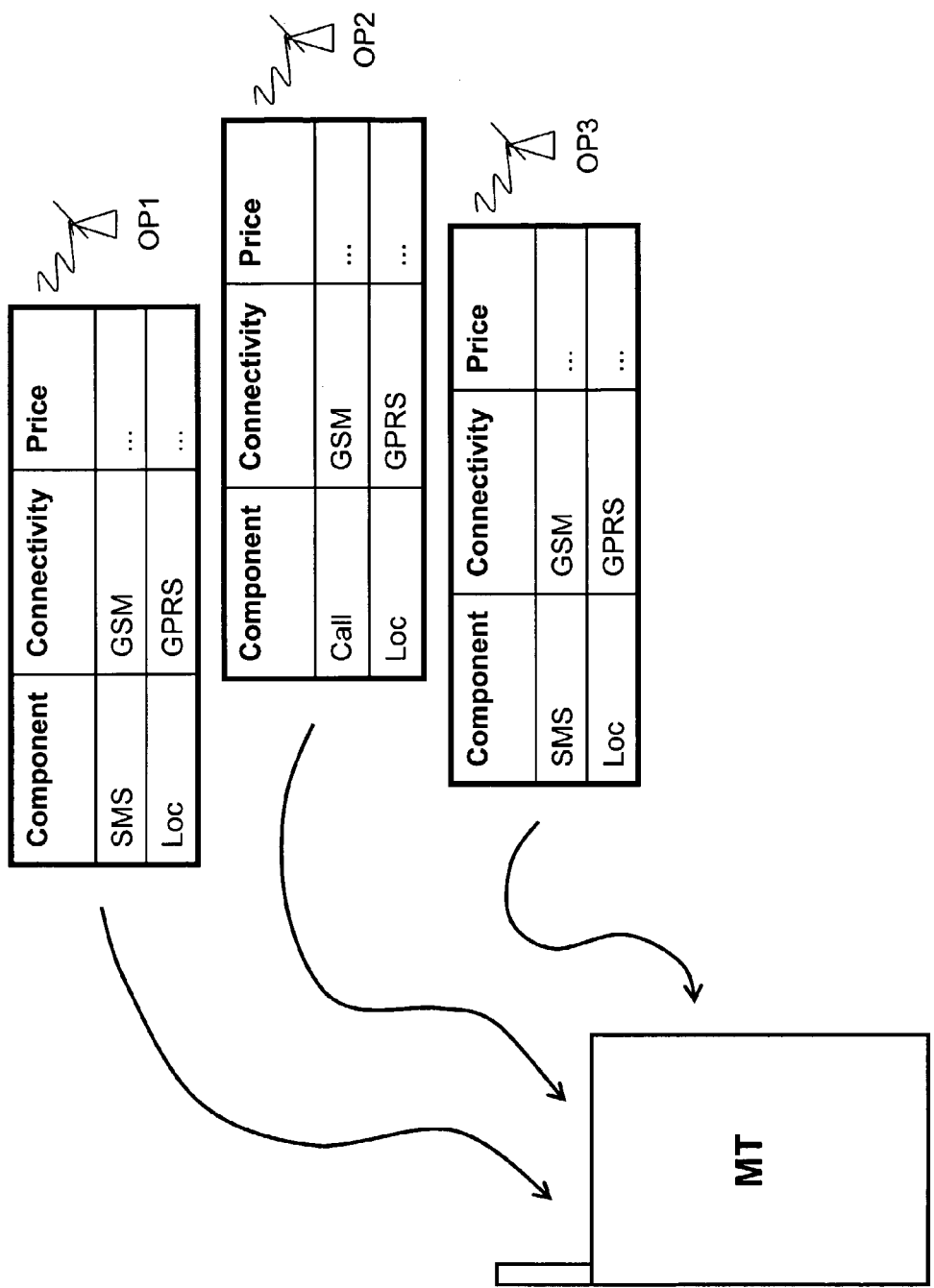
FIG. 1 shows an embodiment of a wireless mobile telecommunications terminal according to the present invention located in a area where three service providers provides several communications services each.

In FIG. 1 a wireless mobile telecommunications terminal MT is shown that is located in an area covered by three telecommunications service providers, or network operators, OP1, OP2 and OP3. Each of the providers offers and is able to provide at least one, but in general several "simple" telecommunications services, which can be considered service components of "complex" telecommunications services.

For example, provider OP1 offers a SMS service through a GSM connectivity and a "Loc" (location) service through the GPRS connectivity; provider OP2 offers a "Call" (voice call) service through a GSM connectivity and a Loc (location) service through a GPRS connectivity; provider OP3 offers a "SMS" service through a GSM connectivity and a Loc (location) service through the GPRS connectivity. All of these services are provided at corresponding and typically different prices; in general, even if it is not highlighted in FIG. 1, these different services have other different characteristics, e.g. quality characteristics.

According to the present invention, terminal MT is able to select and use the functionality of any of these service components, i.e. SMS service from operator OP1 or OP3, Call service from operator OP2, Loc service from operator OP1 or OP2 or OP3.

Preferably, terminal MT has a preferential relation with a certain service provider. Typically, this is due to the fact that a SIM card of this service provider is installed inside the terminal. The SIM card assigns a telephone number [MSISDN—Mobile Station International ISDN Number] to terminal MT and the corresponding service provider allows incoming calls to reach terminal MT. This requires that terminal MT registers with this service provider typically when it is switched on. Registration usually implies that the terminal and its user identifies with a service provider and authenticates directly with this service provider; thereafter, the terminal is considered an active terminal by the wireless telecommunications network.

Terminal MT, like any wireless mobile telecommunications terminal usually needs memory devices for its operation. These devices are usually of different types (i.e. ROM [Read Only Memory], RAM [Random Access Memory], EPROM, [Electrically Programmable Read Only Memory], EEPROM [Electrically Erasable and Programmable Read Only Memory]). These memory devices may be grouped into memory modules. Typically, some memory devices are internal to the terminal (i.e. comprised) and some memory devices external to the terminal (i.e. applied to it); a SIM card, e.g., comprises memory devices that are applied to the terminal when the SIM card is installed inside a terminal. Other kinds of memory devices can be applied to the terminal, e.g, Multimedia Cards™. It is to be noted that programs and data may be stored in internal and/or external memory devices depending on the terminal architecture and on the type of programs and data.

Terminal MT is provided with the following functionalities:

F1: Service components offers acquisition: this functionality allows the terminal to collect and store information relating to available service components at a certain time in a certain area where the terminal is located; such information comprises at least service cost or service quality. The collection of such information may be carried out in one or more of the following ways: part of this information may be permanently stored (e.g. in the SIM card), manually input by a user, received from service providers and/or information providers through dedicated communications channels, retrieved in archives of service providers and/or information providers.

F2: Service components identification: this functionality allows to identify the service components required for the telecommunications service desired by a user. The number and types of service components may be derived automatically from information, e.g. a script, stored in memory devices associated with terminal MT.

F3: Service components selection: this functionality allows to select for each required service component the service provider that offers this service component most appropriate for the user of terminal MT and for the service desired by the user. This selection may follow different criteria; for example, the selection may be based on the cost of the service component or one ore more quality characteristics of the service component, e.g. the communication channel bandwidth, the time required for obtaining the service, F4: Service components connection: this functionality allows to activate a communications connection for each service component. If the service component is to be used locally, the connection is used for downloading the service component from the service provider into terminal MT; after downloading the service component might be stored into memory devices associated with terminal MT and internal or external thereto, e.g. into the SIM card. If the service component is to be used remotely, the connection is used for the interaction between the service provider and terminal MT.

F5: Service execution: this functionality allows to appropriately arrange different service components in order to obtain a telecommunications service, typically a complex service. The logic according to which the components are arranged is expressed through a program or "service program", e.g. a script or "service script" (i.e. a program in source format to be interpreted by a processor), comprising typically a set of instructions stored in memory module associated with terminal MT, preferably in a SIM card. Some of these instructions when executed cause the invocation of a service component. These programs may be e.g. pre-stored in a SIM card or downloaded e.g. from a service provider into a SIM card.

The use of a service component by a terminal may take place through the exchange of information (typically commands/requests and results/replies) according to a predetermined application protocol or a set of application protocols, the protocol or protocols depending on the service component.

Essentially, service components may be of two types: remote service components and local service components.

In case of remote type component, the service component is a network element, therefore the interaction between the terminal and the component takes place through a communication channel. A component may support different types of connectivity for its communication channel. For example, the same component might be reached through a GSM connectivity by means of SMS messages or through a GPRS or UMTS connectivity by means of IP packets.

In case of local type component, the service component is a software module that is previously stored into the terminal. Therefore the interaction with the component takes place internally to the terminal, including any memory device applied to the terminal, for example comprised in a SIM card. In this case, the downloading of the component requires a communication channel (e.g. through the OTA [Over-The-Air] standard).

Part of the memory of the terminal and/or applied to the terminal, such as a SIM card, is dedicated to store information relating to the status of the various service components. To this purpose, each service component is identified, e.g. by an identification code, and associated with information relating to its status. A component may be in one of the following status:

S1: IDENTIFIED: the type of component is known but it has not yet been selected among the components available to the terminal, S2: SELECTED: the component has been selected, i.e., a service provider has been selected and the address for accessing to the component is known, S3: ACTIVE: the component can be invoked, as an access channel is open that allows to interact with the component and its functionality can be used. The transitions between these states take place as follows:

→S1 (assignment to state S1) when e.g. a script is analysed and a component type is identified, S1→S2 when a selecting step is carried out among available components of a certain component type, e.g., from different providers, S2→S3 when a connection activation step is carried for downloading and/or interacting.

Functionality F1 (service components offers acquisition) can be carried out through the following mechanisms:

1. Offer representation (data model): an offer shall preferably contain at least the following information:
   a. Provider code (e.g. OP1)
   b. Component functionality (e.g. location)
   c. Component type (e.g. local, remote)
   d. Types of Connectivity supported (e.g. GSM, GPRS, EDGE, ... )
   e. Connectivity provider (e.g. OP2)
   f. Access address (e.g. URL [Uniform Resource Locator or Universal Resource Locator—the address for a file accessible on the Internet])
   g. Tariff information
   h. Quality characteristics (e.g. bandwidth, delay, precision, ... ), and optionally other information.
2. Representation coding: the above mentioned information shall be represented by a suitable sequence of binary information using known methods in order to be transmitted and correctly interpreted by the communications terminals.
3. Transmission method: basically two possibilities can be considered:
   a. Broadcast transmission by the service providers and acquisitions by scanning through the channels frequencies (as in the case of roaming)
   b. Interrogation by the terminal to the various service providers.

As the service component offers are generally transmitted by different service providers and are received and interpreted by different terminals, it is advantageous that identical or at least compatible data models are used by the various service providers; in this way, it is easier for the terminals to interpret such data. This can be achieved by a standardization activity within a standardization entity. It is to be noted that a data model can also be extended (e.g. with other information) if such extension is described through known and shared formalisms.

Functionality F2 (service components identification) is typically carried by analysing the script corresponding to the telecommunications service chosen by the user; the script might have a header part where all required service components are listed.

Functionality F3 (service components selection) leads to the selection of all components of the required types and the corresponding service providers, i.e. to all necessary transitions from state S1 to state S2. This selection may be take also into account the user; this can be done for example by storing a user profile, e.g. in the terminal or in the SIM card, expressing the user's preferences (e.g. fixed choices or fixed rules) or the need for input by the user. The selection phase may start with a check that the user profile provides indication on how to deal with a specific component type; if this is the case, either a fixed choice is provided by the profile or the user is requested to make a choice and the terminal will provide a list of possible choices (the last choice of the user being preferably highlighted); if this is not the case, the terminal will make a choice according to some predetermined rules.

Functionality F4 (service components connection) leads to the activation of all necessary components for obtaining the telecommunications service chosen by the user, i.e. to all necessary transitions from state S2 to state S3.

For doing that the terminal needs to access to each service component; two possibilities are provided:

the terminal downloads locally the component,
the terminal interacts with a component that is located remotely, e.g. on a server of the service provider.

In both cases, the terminal has to realize a connection or telecommunication link with the service provider. By connection, or telecommunication link, it is meant, here and throughout the present description and claims, a connection or link at the transport layer, according to the seven layer OSI stack, or at an equivalent layer in a different layer subdivision. Typically, a connection or link at the transport layer corresponds to an end-to-end connection with an end-to-end flow and error control between two host computers or terminals.

Before accessing to a component, the terminal and/or its user usually has to identify itself with the provider of the service component; usually providers keep a list of the users authorized to use their services.

In GSM, user and equipment are explicitly distinguished and dealt with separately. The international mobile station equipment identity (IMEI), which is a kind of serial number, uniquely identifies a mobile terminal (MT) internationally. The IMEI is allocated by the equipment manufacturer and registered by the network operator (i.e., the service provider). Each registered user, i.e., the subscriber, is uniquely identified by its international mobile subscriber identity (IMSI). The IMSI is typically stored in the SIM card. A MT can only be operated if a SIM with a valid IMSI is inserted into equipment with a valid IMEI. The "real telephone number" of a mobile station is the mobile subscriber ISDN number (MSISDN) which is assigned to the subscriber (i.e., his or her SIM). Anyway, usually, only a code called temporary mobile subscriber identity (TMSI) is transmitted over the air for security purposes.

An authentication phase often follows the identification phase. During this phase, a service provider checks whether the identity declared by the terminal/user corresponds to the true identity of the terminal/user; this can be done, e.g., through a "password", through an "identity certificate" (e.g. stored in a smartcard), through biometric data (e.g. fingerprints). For instance, in a GSM network system, several databases, such as the Home Location Register, are available for call control and for authentication and security purposes. It is to be noted that the identification phase and the authentication phase may be combined together in a single phase.

In order to download a service component or to interact with a service component, the terminal activates a connection with the provider of the service component; the type of connection depends on the component and can be usually derived from the information associated with the service component offer received during the acquisition phase.

When a telecommunications service requires several service components it might me useful to establish and maintain more then one telecommunication link active at the same time; this will reduce the delay caused by the activation of all the connections; anyway, the possibility of multiple telecommunication links may be limited for example by the architecture of the terminal or by the structure of the script.

Multiple telecommunication links are not strictly required when the service program, e.g. a service script, provides for a sequential interaction with the various service components.

On the contrary, multiple telecommunication links are very useful when the service program, e.g. a service script, provides for a simultaneous interaction with the various service components.

It must be noted that two different telecommunication links may use the frequency channels of the same bandwidth or frequency channels of different bandwidths; in the second case, the telecommunications terminal is provided with two radio circuit modules. For example, different telecommunication links can be available with the MultiRAB feature of UMTS or the DTM feature in GSM.

Once the telecommunication link has been activated, the terminal may use it for downloading the or interacting with the corresponding service component through the provided application protocol.

The identification of the terminal or user is generally used primarily for billing purposes; additionally, the service provider may use such identification for controlling the access to the service component in order to implement e.g. access policies and access histories.

As explained before, a terminal usually registers with the service provider of the SIM card installed in terminal itself; this generally implies a direct authentication of the terminal and/or user in the telecommunication network of this service provider. After registration, the terminal can be "reached" by this service providers (i.e. the user can receive e.g. phone calls or SMSs), In other terms, the service provider has assigned an identifier (e.g., IMSI, IP address) of its telecommunication network to the terminal.

Advantageously, this service provider may act as an "identity provider" and as a "billing provider" for other service providers. In other words, the service provider associated with the SIM card can act as a "primary" service provider. The identification (or authentication, if any) can be carried out e.g. in a way similar to the method used in case of "roaming" according to the GSM standard.

Functionality F5 (service execution) is carried out through the use of active service components.

In order to obtain the service, typically a complex service, the terminal has to follow a certain logic flow that can be expressed through a service program. This program can be a program to be interpreted, i.e. a "script" written e.g. in XML [eXtensible Markup Language]. Alternatively, this program can be a compiled program.

In case of script, the terminal executes it through a script interpreter previously installed in memory devices associated with the terminal.

In case of compiled program, a source code is written by a programmer in a traditional programming language e.g. C, C++, Java; then the source code is compiled in a computer (e.g. of the programmer) by a program called "Compiler" and an object code is generated; finally, the object code is stored into memory devices associated with the terminal. The terminal, through an internal processor, is able to execute directly this object code.

The connections for the service components may be activated before starting service execution or when the execution requires a certain service component. Particularly, for local type components, both possibilities are valid in any case, whereas, for remote type components, the choice may depend on the terminal constraints and on the component constraints (e.g. whether the terminal is able to support more than one telecommunication link at the same time, or whether a component generates data asynchronously over a long time period).

When there is a need for the functionality provided by a service component, two possibilities exist:

the component is of a local type: if it is not yet downloaded, the terminal executes all the operations necessary for activating a connection (including identification) and for carrying out the download by using the appropriate download application protocol; once the component is stored in the memory devices associated with the terminal, the terminal may interact with the component through the appropriate interaction application protocol, such as SOAP (Simple Object Access Protocol) and Java Application Program Interface.

the component is of a remote type: the terminal executes all the operations necessary for activating a connection (including identification), if not yet active; thereafter, the terminal interacts with the component according to the appropriate interaction application protocol; once the interaction is finished, the terminal may deactivate or terminate the connection if the component is not necessary any longer or if the terminal can not manage multiple connections.

During service execution, the terminal may use basic functions provided by the terminal, i.e. its hardware and its firmware and its operating system, for example for receiving user input through the User Interface; additionally, during service execution, the terminal may use its internal memory or external memory e.g. of a SIM card.

If remote type components are used which interact asynchronously with the terminal, it should be provided that the terminal be ready to appropriately receive their information; two possibilities may be implemented:

Push mode: the connection with the component is kept active and "handlers" (i.e. software modules designed to wait for specific messages and to process these messages as soon as they are received) are defined for managing the messages received asynchronously; additionally, the interpreter/executor must be able to manage parallel threads;

Pull mode: the component is regularly or periodically interrogated to check whether there is any message for the terminal through a specific feature of the application protocol.

Once the execution of the service is completed, the terminal can release all the resources used for the execution, in particular it can deactivate or terminate all the connections and delete all downloaded service components; alternatively, some or all service components may be stored for future use.

In general, the method for obtaining telecommunications services from a plurality of service providers through a telecommunications terminal comprises the steps of:

A) selecting a telecommunications service,
B) identifying the or each service component required for the selected telecommunications service, each service component having predetermined functionality,
C) selecting a service provider for the or each identified service component,
D) activating a connection with the or each selected service provider for the or each identified service component, and
E) invoking the functionality of the or each identified service component.

Advantageously, it may further comprises one or more of the following steps:

F) deactivating the or each activated connection,
G) providing identification information from said terminal to the or each selected service provider,
H) registering said terminal in a single telecommunication network of a network operator.

It is to be noted that, as should already be clear from the above description, the steps of the above list may be carried out in a different order from the above listing order. There can be certain time constraints, e.g. a connection can not be deactivated before being activated, and certain practical constraints, e.g. terminal identification, if any, shall precede terminal connection and terminal registration, if any, with a "primary" service provider shall precede any other step.

Nowadays, the method of the present invention finds typical application in wireless mobile telecommunications terminals which include the so-called "mobile phones" or "cellular phones" but also other electrical equipments integrating or coupled to a wireless mobile telecommunications device, such as a PC [Personal computer] coupled to a GSM or UMTS modem, e.g. a PC card modem.

Anyway, in the future, the present invention may find application in other telecommunications terminals provided they can be reached by a plurality (at least two) of telecommunications service providers through appropriate communications media, i.e. electrical cables and/or optical fibres and/or terrestrial radio channels and/or satellite radio channels; even in this case, the term "telecommunications terminal" is used in a broad sense and such to include electrical equipments integrating or coupled to a telecommunications device.

Figures from FIG. 2 to FIG. 6 helps in clarifying the method according to a preferred embodiment of the present invention and will be explained in the following.

Figure 2:
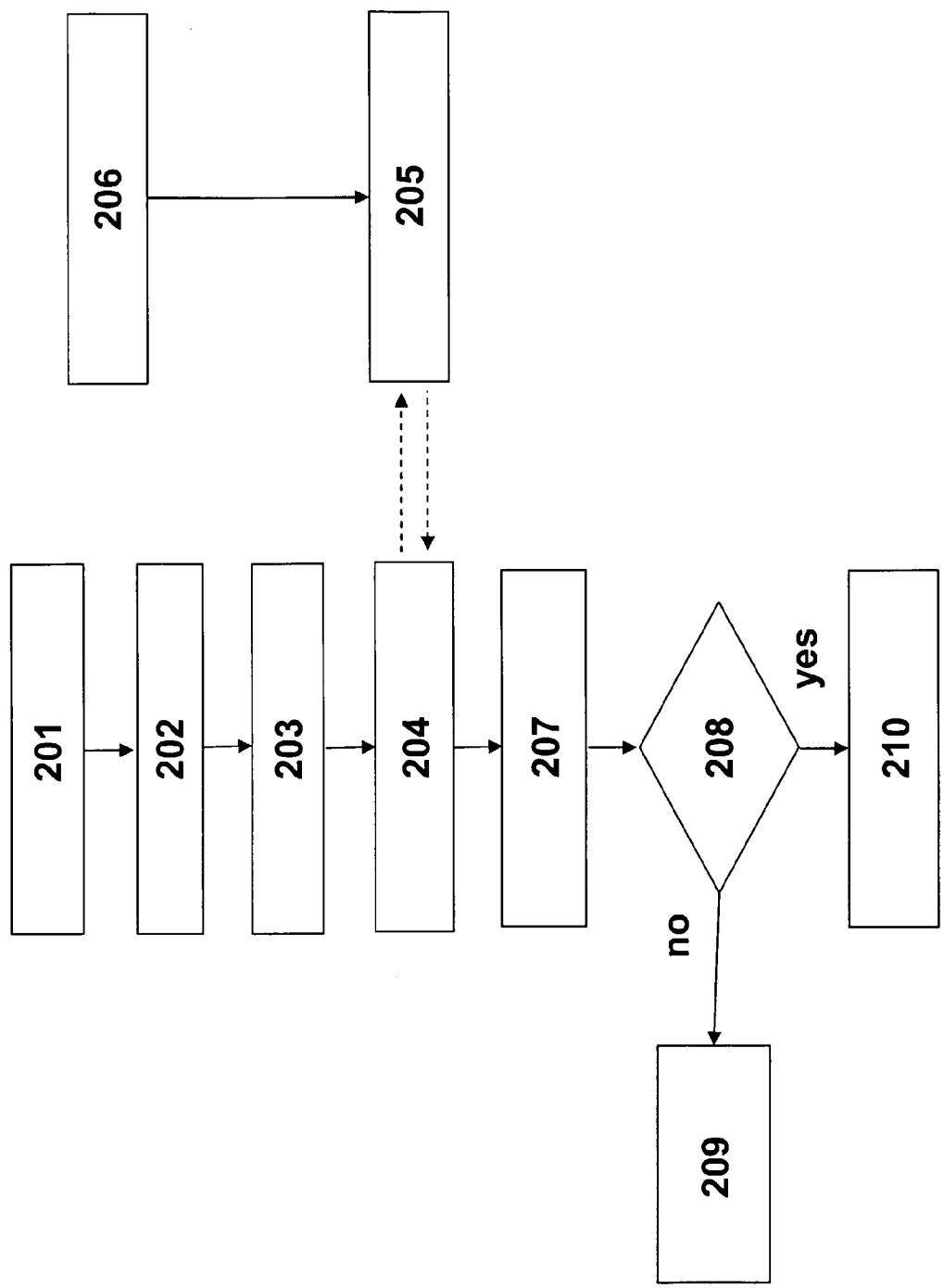
FIG. 2 shows a flow chart corresponding to an implementation of the method according to the present invention by a wireless telecommunications mobile terminal.

FIG. 2 shows a flow chart corresponding to an implementation of the method according to the present invention through a wireless mobile telecommunication terminal located in a certain area.

At step 201 the terminal automatically shows the list of the telecommunications services available for the user in response to a corresponding input by the user (e.g. selection of an item in a command menu).

At step 202 a user selects telecommunication service A, e.g. a complex telecommunications service; in other words the user would like to obtain from the terminal telecommunications service A.

At step 203 the terminal automatically identifies the types of service components required by service A, e.g. SMS, Call and Loc; this can be achieved e.g. from the script and, more specifically, from the definition part of the script.

Figure 3:
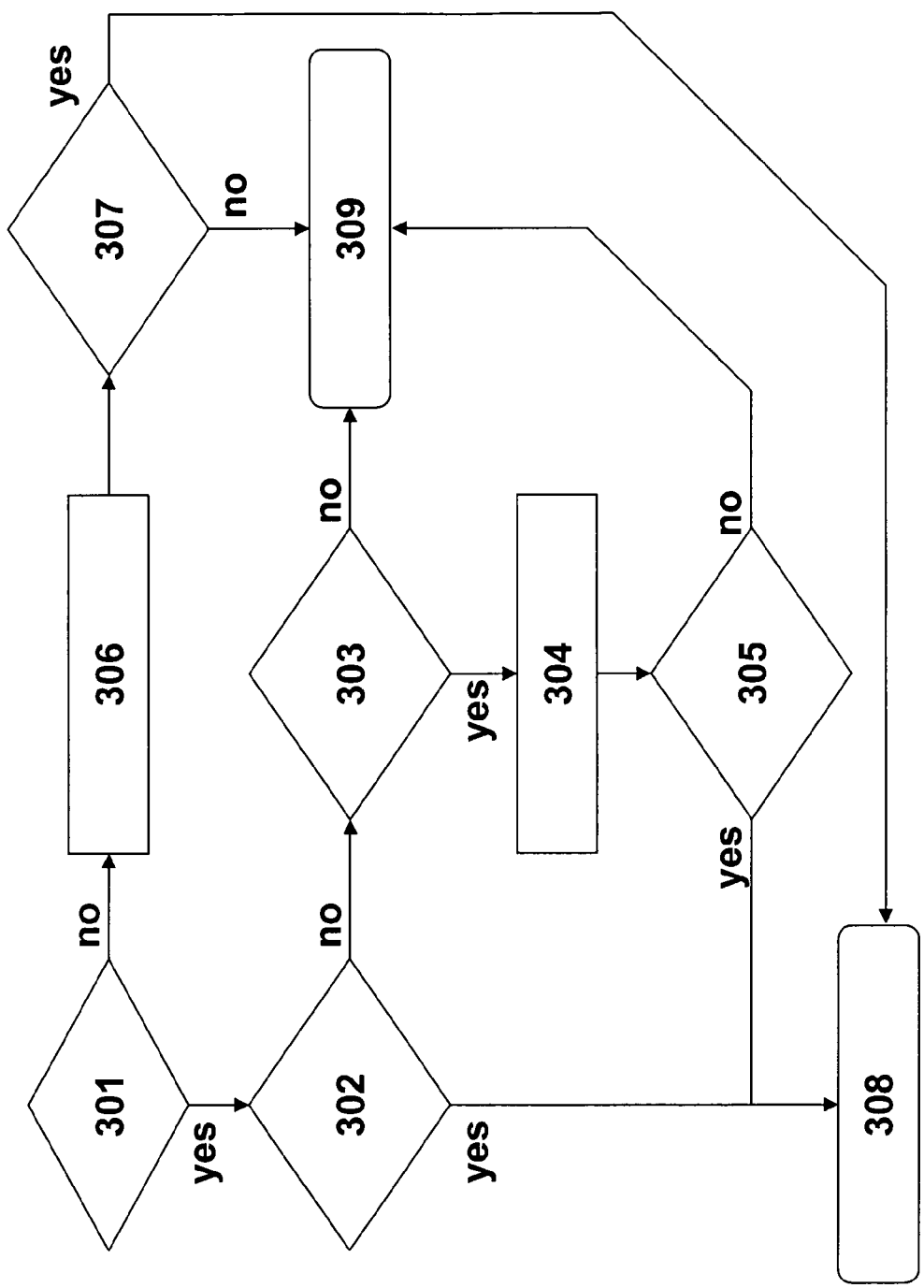
FIG. 3 shows a flow chart corresponding activities for selecting a service component.

At step 204 the terminal automatically determines the service components that can be selected for service A (this is better explained through the flow chart of FIG. 3).

At step 205 the terminal updates the list of all service components that can be used by the terminal; step 205 may be triggered by step 204 or by step 206; step 206 corresponds to a user request to update the service components list, or may be carried out regularly/periodically by the terminal in an autonomous way.

At step 207 the terminal selects the service components to be used for obtaining service A and the corresponding service providers.

At step 208 the terminal checks whether all the necessary service components have been successfully selected; how this can be done will be apparent when considering the flow chart of FIG. 3.

If the result of the check at step 208 is negative, step 209 follows and the terminal issues an error message signalling that service A can not be obtained.

If the result of the check at step 208 is positive, step 210 follows and the terminal executes a program, e.g. a "script" corresponding to service A.

FIG. 3 shows a flow chart corresponding to the activities for selecting each service component and that are provided at step 207 in FIG. 2.

At step 301 the terminal checks whether the user profile provides a certain service component type.

If the result of the check at step 301 is negative, step 306 follows and the terminal carries out an automatic component search of said component type; thereafter step 307 follows and the terminal checks whether a selectable service component has been found.

If the result of the check at step 307 is negative, step 309 follows and the terminal registers that no service component has been selected.

If the result of the check at step 307 is positive, step 308 follows and the terminal selects the found service component.

If the result of the check at step 301 is positive, step 302 follows and the terminal checks whether the user profile specifies a predetermined service component and whether this service component can be selected (e.g. is available at that time in that area).

If the result of the check at step 302 is positive, step 308 follows and the terminal selects said predetermined service component.

If the result of the check at step 302 is negative, step 303 follows and the terminal checks whether there is at least one selectable service component.

If the result of the check at step 303 is negative, step 309 follows and the terminal registers that no service component has been selected.

If the result of the check at step 303 is positive, step 304 follows and the terminal prompts the user to input a service component.

At step 305 the terminal checks whether the service component input by the user can be selected.

If the result of the check at step 305 is negative, step 309 follows and the terminal registers that no service component has been selected.

If the result of the check at step 305 is positive, step 308 follows and the terminal selects said user input service component.

Figure 4:
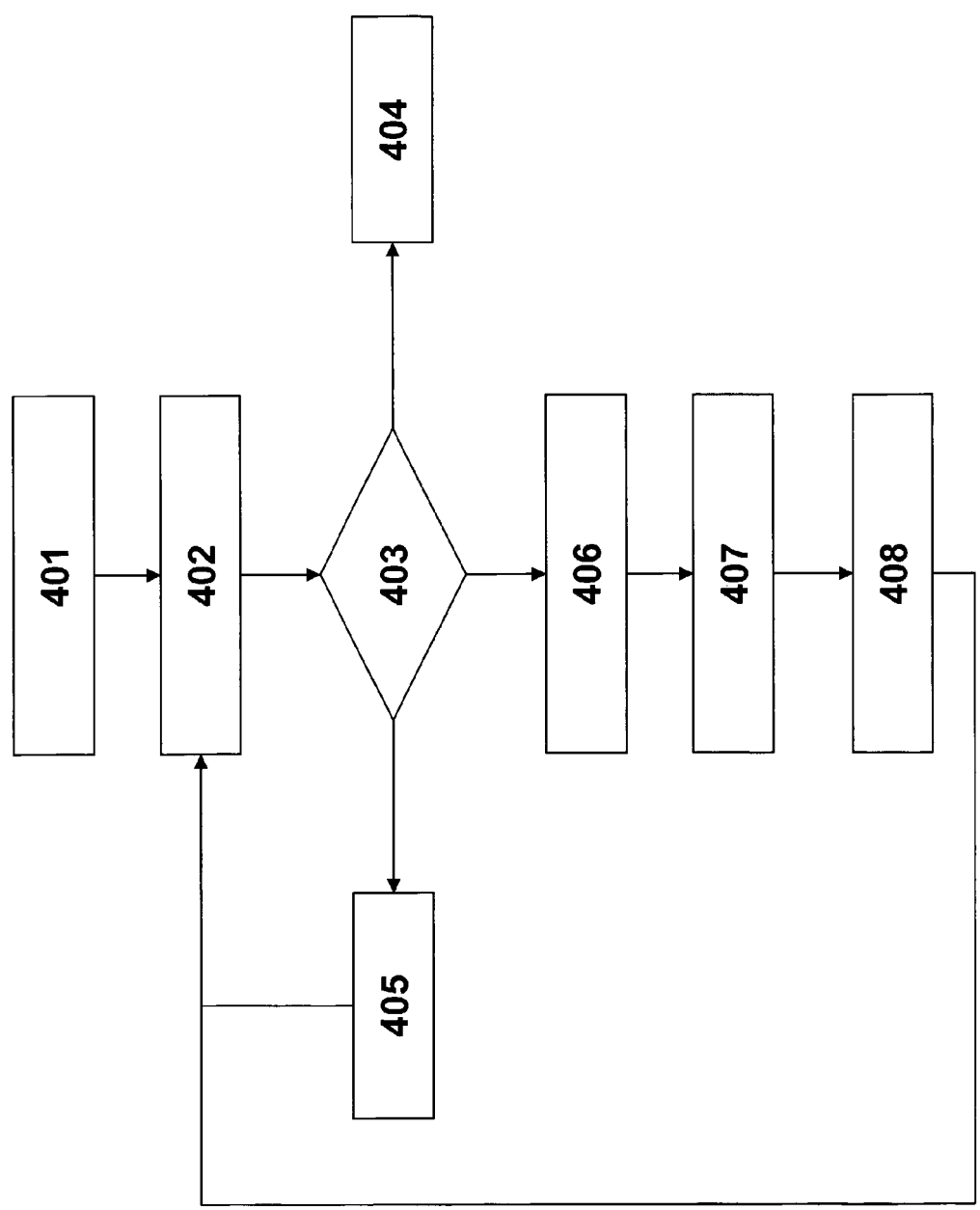
FIG. 4 shows a flow chart corresponding activities for executing a script by a wireless mobile telecommunications terminal.

FIG. 4 shows a flow chart corresponding to the activities for executing a script and that are provided at step 210 in FIG. 2.

At step 401 the terminal carries out the program initialisations, e.g. of variables, and registers.

At step 402 the terminal fetches the next instruction to be executed; after step 401, the next instruction is the first instruction of the script.

At step 403 the terminal determines the type of instruction to be executed.

If the type determined at step 403 is "STOP", step 404 follows and the execution is terminated, e.g. allocated memory areas are freed and the control is returned to the operating system of the terminal.

If the type determined at step 403 is "LOCAL", step 405 follows and the instruction is executed locally to the terminal, e.g. an assignment operation, an I/O operation; here, for example, primitives of the operating system may be used.

If the type determined at step 403 is "COMPONENT INVOCATION", step 406, 407 and 408 follow and the terminal at first carries out activities for activating a connection (step 406), then invokes the service component (and wait for the correspond results and/or replies) (step 407), and finally carries out activities for deactivating, or terminating, the activated connection (step 408).

After step 405 and after step 408, step 402 is repeated again.

Figure 5:
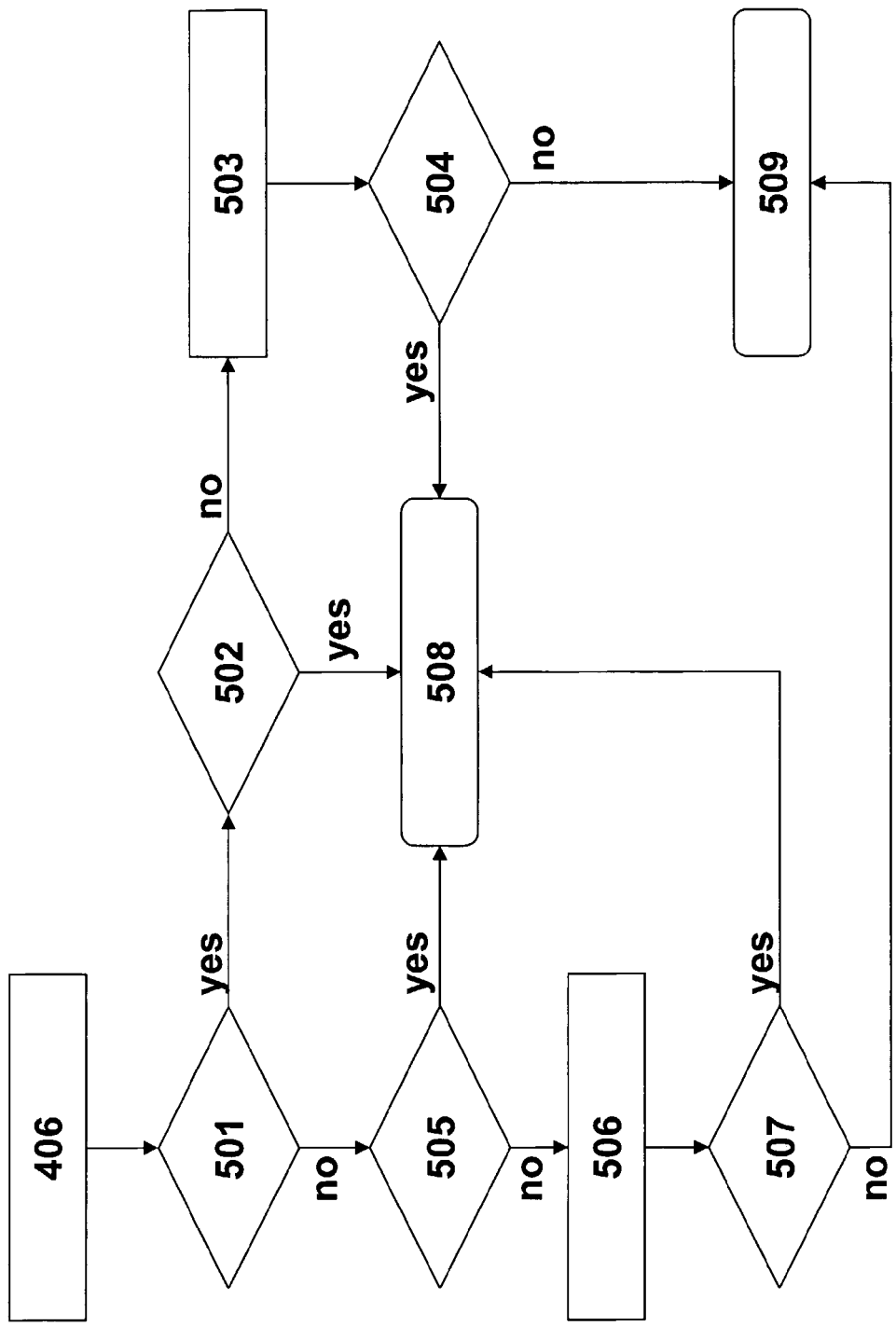
FIG. 5 shows a flow chart corresponding to activities for activating a connection.

FIG. 5 shows a flow chart corresponding to the activities for activating a connections and that are provided at step 406 in FIG. 4.

At step 501 the terminal checks whether the component is local or not.

If the result of the check at step 501 is positive, step 502 follows.

If the result of the check at step 501 is negative, step 505 follows.

At step 502 the terminal checks whether the component is already downloaded locally or not.

If the result of the check at step 502 is positive, step 508 follows and the component is marked as "ACTIVE" and can be invoked.

If the result of the check at step 502 is negative, step 503 follows and the terminal starts a downloading procedure.

At step 504 the terminal checks whether the downloading procedure of step 503 has been successful.

If the result of the check at step 504 is positive, step 508 follows and the component is marked as "ACTIVE" and can be invoked.

If the result of the check at step 504 is negative, step 509 follows and the component is marked as "NON-ACTIVE" and can not be invoked.

At step 505 the terminal checks whether there is already a connection with the remote component or not.

If the result of the check at step 505 is positive, step 508 follows and the component is marked as "NON-ACTIVE" and can not be invoked; it is assumed in this example that a single network connection is possible at each time.

If the result of the check at step 505 is negative, step 506 follows and the terminal starts a connection activation procedure.

At step 507, following step 406, the terminal checks whether the connection activation procedure has been successful or not.

If the result of the check at step 507 is positive, step 508 follows and the component is marked as "ACTIVE" and can be invoked.

If the result of the check at step 507 is negative, step 509 follows and the component is marked as "NON-ACTIVE" and can not be invoked.

Figure 6:
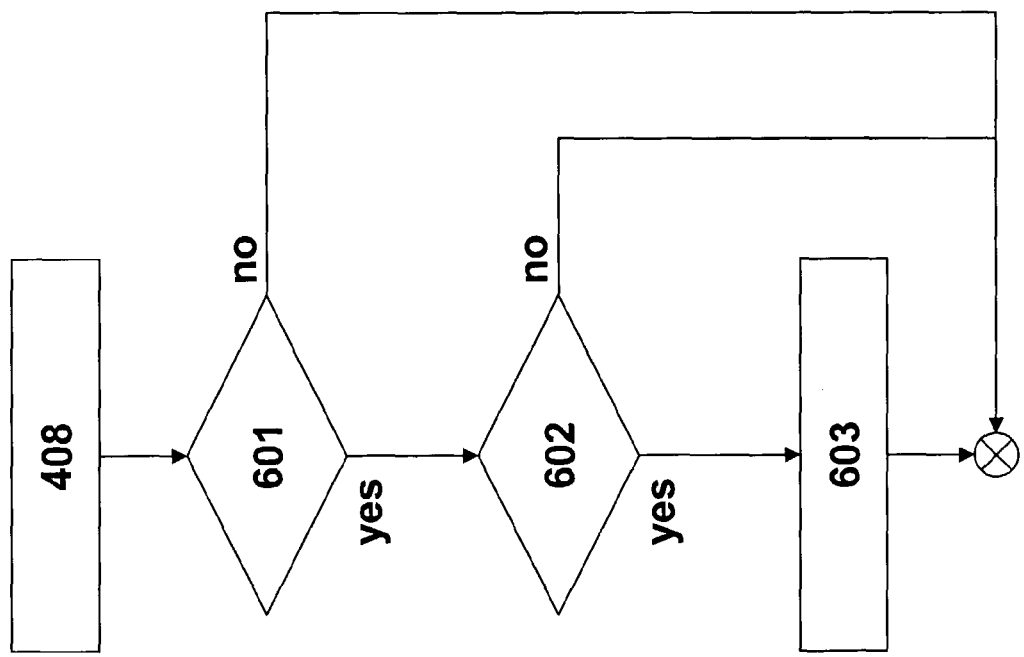
FIG. 6 shows a flow chart corresponding to activities for deactivating a connection.

FIG. 6 shows a flow chart corresponding to the activities for deactivating a connection and that are provided at step 408 in FIG. 4.

At step 601 the terminal check whether the connection is still active.

If the result of the check at step 601 is negative, the process flow ends.

If the result of the check at step 601 is positive, step 602 follows and the terminal checks whether the connection need to be deactivated.

If the result of the check at step 602 is negative, the process flow ends.

If the result of the check at step 602 is positive, step 603 follows and the terminal terminates the connection.

According to a further aspect, the present invention relates also to a telecommunications terminal adapted to carry out the above generally defined method, in particular a wireless mobile telecommunications terminal, such as the mobile terminal, labelled as MT, shown in FIG. 1.

Figure 7:
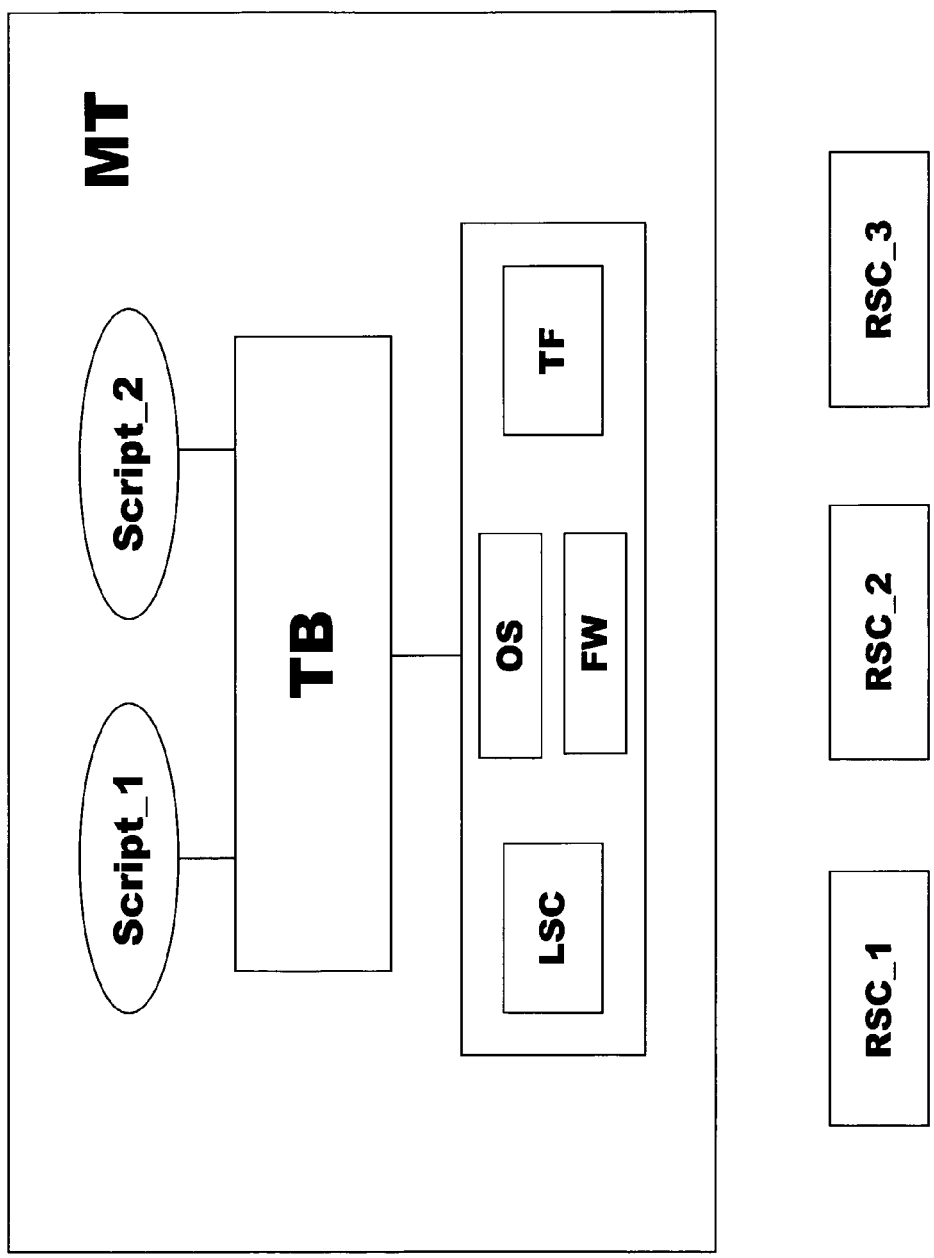
FIG. 7 shows a general block diagram of the wireless mobile telecommunications terminal of FIG. 1.

FIG. 7 shows a general block diagram of the wireless mobile telecommunications terminal of FIG. 1 limited to the features relevant for a preferred embodiment of the present invention.

Terminal MT provides a module TB that stands for "Terminal Broker" and that deals with the telecommunications services request from the user of terminal MT according to the method of the present invention.

In the example of FIG. 7, module TB can have access to two scripts, Script_1 and Script_2, for two corresponding different communications services Service_1 and Service_2.

Additionally, module TB may use terminal functions TF, the terminal operating system OS and the terminal firmware FW while executing the scripts.

In order to obtain a communications service for its user, module TB can access and invoke service components. In the example of FIG. 7, a local service component LSC is shown and three remote service components RSC_1, RSC_2 and RSC_3 provided by different service providers are shown. These remote service components may be reached by one or more telecommunications networks using appropriate telecommunications media, e.g., electrical cables and/or optical fibres and/or terrestrial radio channels and/or satellite radio channels.

Figure 8:
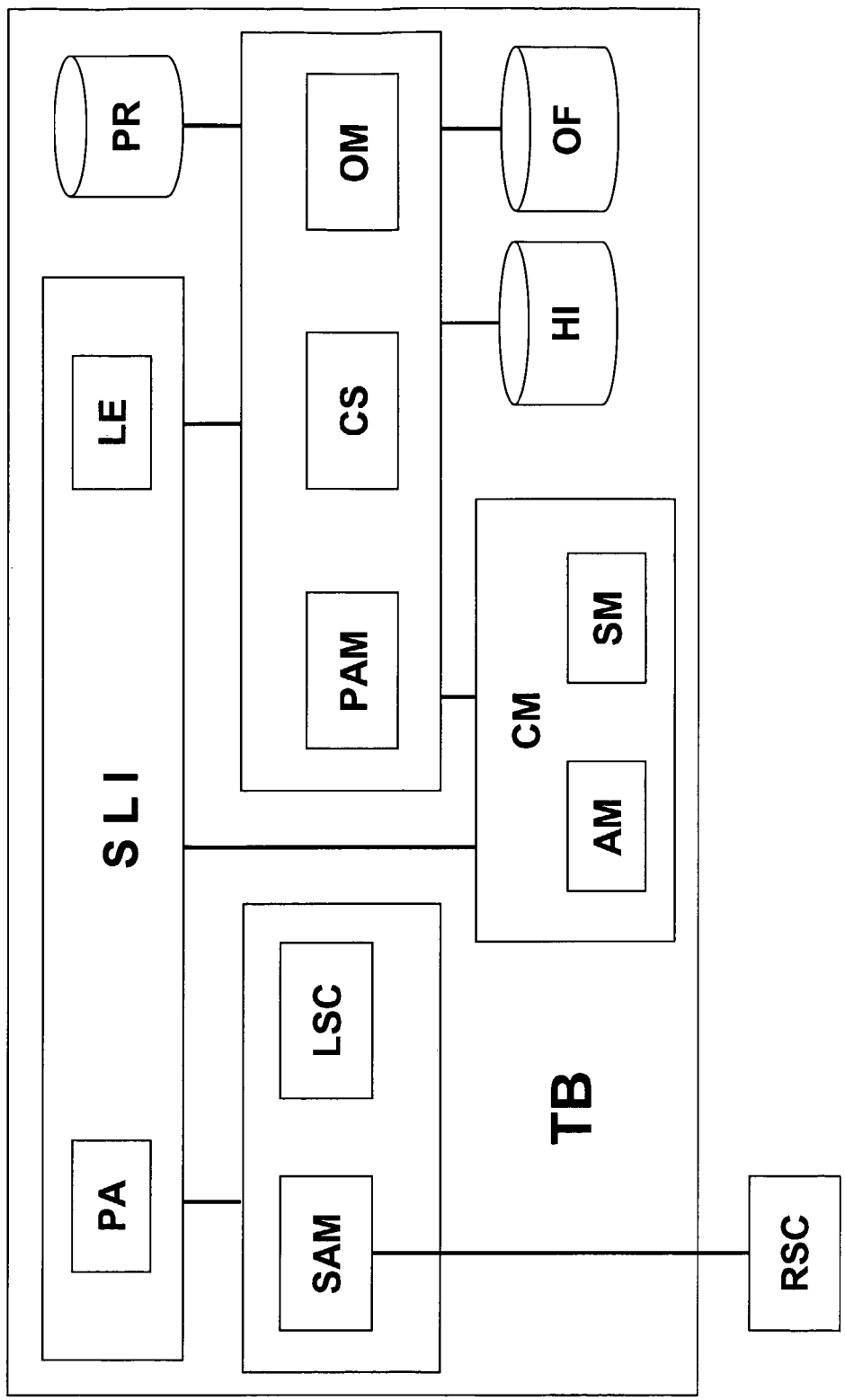
FIG. 8 shows a detailed block diagram of the terminal broker in the wireless mobile telecommunications terminal of FIG. 7.

Module TB will be described in more detail with the help of the block diagram of FIG. 8; it is to be understood that the following description corresponds only to a specific embodiment of this module.

Module TB is provided with a script logic interpreter SLI that is able to implement the logic flow incorporated in the scripts; the main functional block of interpreter SLI are:
  parser PA: it recognizes and parses the instructions comprised in a script and coded in an appropriate language,
  logic executor LE: it executes the instructions of a script, in particular:
    it requests to a component selector CS a service component of a specified type (e.g. "Call" component, "SMS" component, "Yellow Pages" component, . . . ),
    it invokes the functionality of a connectivity manager CM, particularly a selector module SM for identifying and selecting a network connection and an activator module AM for activating and deactivating the selected network connection,
    it invokes the functionality of a service access module SAM, in case of a remote service component RSC, or directly of a local service component LSC Module TB is provided with profiles PR, in particular a script profile SPR and a user profile UPR.

The script profile contains the configurations defined by a user relating to the scripts to be executed. For example, at the execution of a certain script, the script profile may specify that a certain "Call" service component must be used. Through these configurations, a user may define a particular profile for using the resources when executing a certain service script.

The user profile contains the configurations defined by a user relating to the way of using the components; in particular, this profile defines the rules for selecting the various service components; selections rules may be:
  fixed,
  history based,
  interactive,
  script based (script profile).

According to the "fixed" rule, the component to be selected has been fixed by the user; in this case, the component is indicated in the user profile.

According to the "history based" rule, the actual selection is carried out according on the basis of previous selections; for example, the actual selection of a certain component should be the same as the last selection of the same component.

According to the "interactive" rule, the selection is carried out by prompting the user to input data; for example, the terminal may show a selection menu listing all service component that can be selected in that location at that time.

According to the "script based" rule, the selection is carried out based in the particular script to be executed; for example, a user may define appropriate script profiles with a corresponding list of components to be selected.

Module TB is provided with a profile access module PAM. This module takes care of the access to the information contained in the user profiles and in the script profiles. Typically, information from a user profile has priority over information from a script profile.

Component selector CS has the task to select a service component of the type (e.g. Call, SMS, . . . ) identified by parser PA during parsing a script based on what is specified in the user profile and in the script profile. The information of the profiles can be accessed by component select CS by interaction with profile access module PAM.

An offers acquisition module OM is also provided for acquiring data relating to the service component offered (and provided) by the various service providers.

Component selector CS requests to offers acquisition module OM the service components that can be used by terminal MT and provides parameters relating to a selected service component, for example:
 local/remote component,
 connection type,
 component access way (URL, local path, . . . ).

An archive HI is provided for storing the history of the selected service components; this history can be used for carrying out future selections. Archive HI may used by component selector CS for selecting a service component when the selection rule of the component in the user profile is "history based".

An archive OF is provided for storing all the service components offered (and provided) by the various service providers. Archive OF is used by offer acquisition module OM.

The service components are modules that provide communications functionality and that can be used, e.g., for providing complex telecommunications services, when appropriately assembled according to a logic flow incorporated in a script. In order to do that, service components must be classified in categories (e.g. Call, SMS, Yellow Pages, . . . ). They can be local or remote. For every service component the following are defined:
 a local interface implemented by a local service component (LSC) or by a service access module (SAM), defined by e.g. a function prototype;
 a remote interface implemented by a remote service component (RSC), defined, e.g., by a WSDL (Web Services Description Language) document.

Module TB is provided with a connectivity manager CM. It takes care of selecting an appropriate connectivity and of activating it after having checked its availability and of deactivating it when no longer necessary. The functionalities of connectivity manager CM are grouped into two modules:
 activator module AM: it takes care of checking, activating and deactivating the requested connection through methods such as:
  Verify_Connection(type,characteristics),
  Activate_Connection(type,connection-parameters),
  Deactivate_Connection(type).
 selector module SM: it takes care of choosing and selecting a connection of a certain type, taking into account information contained in the user profile (accessible through profile access module PAM); in case of "interactive" selection rule, selector module SM may prompt a user to choose between the available connections that can be determined through the corresponding method of activator module AM.

Module TB is provided with a service access module SAM. It takes care of invoking remote service components RSC through a link to the service component and invocation of its functionalities.

For every kind of remote service component a corresponding service access module SAM is defined; every service access module implements a local interface to be used by script logic interpreter SLI and uses a remote interface of the service component that should be predefined and specific of the particular type of service component.

Advantageously, local service components and remote service components have the same interface for the script logic interpreter.

In the light of the above description, we shall consider how complex communications services may be carried out according to the present invention through a first example and a second example.

According to the first example, two users provided with an appropriate wireless mobile telecommunications terminal each may have a telephone conversation and, at the same time, one of the two users, i.e. User 1, can send to the other of the two users, i.e. User 2, a video filmed during the telephone conversation.

The service will develop according to the steps listed below if two different service providers, i.e. Operator 1 and Operator 2, are used:
 request of voice call from User 1 to User 2; this service component is provided through UMTS circuit-switched connectivity of Operator 1;
 request of video stream from User 1 to User 2; this service component is provided through UMTS packet-switched connectivity of Operator 2 using e.g. IMS [IP Multimedia Subsystem];
 voice call and video stream progression;
 request to terminate video stream; this is obtained by interaction with the service component of Operator 2;
 request to terminate voice call; this is obtained by interaction with the service component of Operator 1.

According to the second example, a user, i.e. User 3, provided with an appropriate wireless mobile terminal connected to a mobile cellular network, such as a GSM network operated by Operator 1, wants to place a reservation with a hotel, i.e. User 4, provided with a fixed video telephone terminal, the hotel being in the vicinity of the place where the user is located.

The service will develop according to the steps listed below if three different service providers, i.e. Operator 3 and Operator 4 and Operator 5, are used:
 request of localization by the terminal of User 3; this service component is provided through GSM connectivity of Operator 3 using SMSs;
 request of "list of hotels" (with e.g. name, address, price and telephone numbers) located in a specified area (e.g. surrounding the previously determined location of the terminal of User 3) by the terminal of User 3; this service component is provided by a Wi-Fi [Wireless Fidelity] hot spot managed by a further organization, i.e., Operator 4;
 request of "map" of the same area; this service component is provided through GPRS connectivity of Operator 3 using IP packets;

After these steps, the terminal of User 3 requests its user to select the preferred hotel based on the parameters in the "list of hotels" received and the "map" received; advantageously, the locations of the various hotels are highlighted on the map. The selected hotel will be referred in the following as User 4.

request of video call from User 3 to User 4; this service component is provided through UMTS circuit-switched connectivity of Operator 5;

video call progression;

request to terminate video call; this is obtained by interaction with the service component of Operator 5.

In the two examples described above, relating to complex telecommunications services, the service components from different service providers are used. By an appropriate selection (fully automatic, partially automatic or manual), the user may obtain a service that perfectly fits with his requirements, e.g. service price requirements, quality requirements.

The invention claimed is:

1. A method for obtaining telecommunications services through a telecommunications terminal, the method performed by the telecommunications terminal and comprising:

acquiring information relating to availability of a complex telecommunications service comprising a plurality of service components;

identifying each service component required for the complex telecommunications service, each service component having different predetermined functionality, wherein identifying each service component is carried out automatically by the terminal;

selecting a service provider from a plurality of service providers for each identified service component;

activating a respective end-to-end connection between the telecommunications terminal and each selected service provider for each identified service component;

providing identification information from said terminal to each selected service provider; and executing software instructions stored in a memory of the terminal to invoke the functionality of at least one of the identified service components, wherein the terminal is registered with only one telecommunication network of the selected service providers, the service provider of the one telecommunication network acting as a primary service provider for the other selected service providers with respect to the terminal.

2. The method according to claim 1, further comprising: deactivating each activated connection.

3. The method according to claim 1, wherein said plurality of service components comprises at least two of a voice call service through GSM connectivity, SMS service through GSM connectivity, video call service through UMTS connectivity, IP service through GPRS connectivity, and terminal location service through GSM or UMTS connectivity.

4. The method according to claim 1, wherein acting as the primary service provider comprises assigning an identifier of the telecommunication network to the terminal and being a billing provider for the other selected service providers.

5. The method according to claim 4, wherein identifying each service component is carried out according to a program stored in one or more memory devices associated with said terminal.

6. The method according to claim 1, wherein selecting a service provider is carried out automatically by said terminal.

7. The method according to claim 6, wherein selecting a service provider is carried out according to a program stored in one or more memory devices associated with said terminal.

8. The method according to claim 6, wherein selecting a service provider is carried out taking characteristics of each identified service component provided by different service providers into account.

9. The method according to claim 8, wherein said service component characteristics comprise at least one of service cost and service quality.

10. The method according to claim 8, wherein said service component characteristics are collected automatically by said terminal and stored in one or more memory devices associated with said terminal.

11. The method according to claim 10, wherein said service component characteristics are collected and stored by said terminal:

before identifying each service component, or after identifying each service component and before selecting a service provider.

12. The method according to claim 6, wherein selecting a service provider is carried out taking data input by a user into said terminal into account:

before identifying each service component, or after identifying each service component and before selecting a service provider.

13. The method according to claim 1, wherein if a service component identified is of a local type, the corresponding connection activated is used for downloading said service component from the corresponding service provider into said terminal.

14. The method according to claim 1, wherein if a service component identified is of a remote type, the corresponding connection activated is used for interacting the corresponding service provider with said terminal.

15. The method according to claim 1, wherein only one of the end-to-end connections is active at the same time.

16. The method according to claim 1, wherein at least two of the end-to-end connections are active at the same time as a consequence of activating a respective end-to-end connections.

17. The method according to claim 1, wherein executing the software instructions to invoke invoking the functionality is carried out automatically by said terminal.

18. The method according to claim 1, wherein identity of said only one telecommunication network is to be read out by said terminal from a memory module associated with said terminal.

19. The method according to claim 1, wherein said telecommunications terminal is a wireless mobile telecommunications terminal.

20. A telecommunications terminal comprising components adapted to carry out the method according to claim 1.

21. The telecommunications terminal according to claim 20, comprising a wireless mobile type.

22. A non-transitory computer-readable storage medium containing instructions that when executed by a computer, perform the method of claim 1.

* * * * *